United States Patent [19]

Novak et al.

[11] Patent Number: 4,841,123
[45] Date of Patent: Jun. 20, 1989

[54] AUTOMATIC WELDING DEVICE

[75] Inventors: Frank Novak, Chamblee; Hartmut W. Fleiss, Marietta, both of Ga.

[73] Assignee: Welding Services, Inc., Atlanta, Ga.

[21] Appl. No.: 63,270

[22] Filed: Jun. 17, 1987

[51] Int. Cl.[4] .............................................. B23K 11/32
[52] U.S. Cl. .............................. 219/125.12; 219/76.1; 219/125.11
[58] Field of Search ........... 219/125.1, 125.11, 125.12, 219/76.1

[56] References Cited

U.S. PATENT DOCUMENTS

| | | | |
|---|---|---|---|
| 1,983,321 | 12/1934 | Stephens | 219/125.11 |
| 3,515,844 | 6/1970 | Colarossi | 219/125.12 |
| 3,604,612 | 9/1971 | Miller et al. | |
| 4,118,620 | 10/1978 | Wall, Jr. et al. | |
| 4,132,338 | 1/1979 | Bove | 219/125.11 |
| 4,260,869 | 4/1981 | Slavens et al. | |
| 4,400,611 | 8/1983 | Wilkinson | |

OTHER PUBLICATIONS

Hy-Tek Systems, Inc. drawing no. D-13-2002-C, "Round-Track", dated Oct. 25, 1983.
Hy-Tek Systems, Inc. drawing No. D-13-1000-B, "Assembly: Carriage Sweep-o-let", dated Jul. 30, 1983.
Hy-Tek Systems, Inc. drawing No. D-13'1000-(4), "Explosion—Dwg", dated Oct. 9, 1984.
Hy-Tek Systems, Inc. drawing No. D-13-1000-B, Sheet:2, "Assembly—Drive Carriage—Sweep-o-let", dated Aug. 15, 1983.
Burkhalter, Stephen, "Innovative Welding Helps Ease BWR Pipe-Crack Problems," Power magazine, Apr. 1985.
Fox, Novak, and Riccardella, "Structural Reinforcement of Recirculation Manifold to Riser Sweepolet Welds by Weld Overlay—Analysis and Application", delivered to the Seminar on Countermeasures for BWR Pipe Cracking, Nov. 15-18, 1983.

Primary Examiner—Teresa J. Walberg
Attorney, Agent, or Firm—Jones, Askew & Lunsford

[57] ABSTRACT

An automated welding device for applying a weld overlay to a preexisting weld at the saddle-shaped juncture between a horizontal header pipe and a vertical riser pipe includes a track mountable to the header and adapted to receive a carriage for orbital movement thereon. The carriage is self-propelled and includes a guide means for engaging a flat surface of the track to maintain the carriage in the desired orientation. A welding torch can be mounted to the carriage for movement toward and away from the surface of the pipe and for movement back and forth across the width of the preexisting weld. The track can be oriented to permit the welding torch to follow a predetermined path in more than one orthogonal plane.

9 Claims, 7 Drawing Sheets

AUTOMATIC WELDING DEVICE

TECHNICAL FIELD

This invention relates generally to automated welding devices, and relates more specifically to a track-automatic remote welding device for overlay repair of saddle-shaped welds.

BACKGROUND OF THE INVENTION

One of the most important phenomena impacting on nuclear power plant reliability in recent years is stress-corrosion cracking of piping systems in boiling water reactors. The problem results from a combination of stress and oxidation in the heat-effected zone of welds in boiling water reactor piping systems. Extending about 0.1 inches on either side of the weld, the heat-effected zone is highly susceptible to cracking because of the high level of residual stresses resulting from heating of the metal to temperatures near its melting point. Once initiated, stress-corrosion cracks are propagated through the pipe wall by the tensile stress acting on the metal. In several cases, cracking has extended completely through the wall, allowing reactor cooling water to seep out of the system, with potentially disastrous results.

Weld-overlay repair is an effective interim repair technique for welds affected by intergranular stress-corrosion cracking. It not only places the pipe interior in compression, but also adds strength by providing a barrier to through-wall crack propagation. Weld-overlay repair consists of applying weld beads to the outer surface of the pipe in the area of the affected weld. The overlay is applied with the tungsten inert-gas process, which is proven to be the most reliable method for achieving defect-free weldments. The weld beads are applied circumferentially and are overlapped to form a sound weld buildup extending n both sides of the existing weld.

In order to allow accurate modeling and calculation of the residual-stress pattern, making it possible to confirm the effectiveness of the completed repair, automatic weld overlay techniques are desirable. In addition, the application of weld overlays to piping systems in boiling water reactors takes place in areas exposed to nuclear radiation from activated components in the vicinity. Thus, in order to reduce unnecessary exposure of maintenance personnel to the radiation, the weld overlay apparatus must not only be automatic but also quickly installable and operable by remote control from a control area safely removed from the contaminated area.

Among the points in piping systems of boiling water reactors most susceptible to stress-related cracking is the juncture between the substantially horizontal recirculating system ring header and the vertical risers projecting upwardly therefrom. These junctures, known as sweepolets, are saddle-shaped orthogonal joints between the large 22" diameter cylindrical header pipe and the smaller 10" diameter cylindrical riser. While the overlay repair technique has been applied successfully to essentially two-dimensional welds such as straight-pipe butt welds and fittings such as elbows and tees, the three-dimensional saddle shape of the header-to-riser arrangement introduces complications from the standpoint of stress analysis and remote application of the weld overlay.

Accordingly, there is a need to provide an automatic welding apparatus which can be quickly attached to a sweepolet joint and operated remotely from the radioactively contaminated area which permits weld-overlay repair of the saddle-shaped sweepolet weld.

Apparatus for automatically guiding a tool such as a weld head or a blow torch around a track are known in the art. For example, U.S. Pat. No. 2,705,629 discloses a flat, band-like track supported above the workpiece, and a carriage which travels around the track for joining two sections of a pipe together. However, that track is designed to provide carriage movement in a single plane, and hence cannot be adapted to the saddle-shaped weld of a sweepolet.

U.S. Pat. No. 4,260,869 discloses a traveling carriage apparatus adapted to travel along a track disposed about or upon a workpiece to carry a weld head. This device provides the additional advantages of three hinged-together portions to compensate for radius changes in a curved workpiece. Again, however, the track can follow a curved contour but only in a single plane.

Accordingly, there is a need to provide a track-mounted welding apparatus which can follow a predetermined path in two orthogonal planes.

SUMMARY OF THE INVENTION

As will be seen, the present invention overcomes these and other problems associated with the prior-art welding apparatus. Stated generally, the welding apparatus of the present invention comprises a means for guiding a weld head along a predetermined path in two orthogonal planes while maintaining a substantially constant orientation between the weld head and the adjacent surface of the workpiece. In addition, the apparatus provides for oscillation of the weld head in a direction substantially parallel to the workpiece surface to permit application of a weld overlay extending either side of a pre-existing weld.

Stated somewhat more specifically, the apparatus of the present invention comprises a weld head adapted to apply a weld overlay to a pre-existing weld along a saddle-shaped juncture between a cylindrical workpiece and a cylindrical pipe intersecting perpendicularly therewith. The weld head is mounted for movement along a saddle-shaped track positionable concentrically to the pre-existing saddle-shaped weld. The weld head carriage includes means for driving the carriage around the track, and the carriage and track cooperate to maintain a constant angular orientation between the weld head and the workpiece surface.

Stated more specifically, the welding apparatus of the present invention comprises a weld head carriage mounted for movement along a closed saddle-shaped track attached to the workpiece surface a pre-determined distance therefrom. A roller mounted for rotation on the carriage in constant angular orientation therewith engages a flat face formed on the track to control the orientation of the carriage with respect to the track to maintain the desired orientation of the carriage with respect to the track. A pair of drive gears on the carriage mesh with a rack mounted on the periphery of the track to provide for positive motion of the carriage along the track. The welding torch is mounted to the carriage for movement toward and away from the carriage so that the welding torch traverses the width of the pre-existing weld. In addition, the welding torch is mounted for movement toward and away from the workpiece, and automatic voltage control circuitry controls the movement in this direction to maintain a constant clearance between the tip of the welding torch and the workpiece surface. In this manner, the weld head can orbitally move around the track in a path in two orthogonal planes while maintaining the welding torch in constant angular relation with respect to the workpiece and a controlled distance therefrom.

Thus, it is an object of the present invention to provide an automatic welding apparatus for weld-overlay repair of a pre-existing saddle-shaped sweepolet weld.

It is a further object of the present invention to provide an automatic welding apparatus which can be quickly attached to a sweepolet joint.

It is yet another object of the present invention to provide an automatic welding apparatus which can be operated remotely from a radioactively contaminated area.

It is another object of the present invention to provide a track-mounted tool positioning apparatus which can follow a pre-determined path in two orthogonal planes.

Other objects, features, and advantages of the present invention will become apparent upon reading the following specification when taken in conjunction with the drawing and the appended claims.

DETAILED DESCRIPTION OF THE DISCLOSED EMBODIMENT

Figure 1:
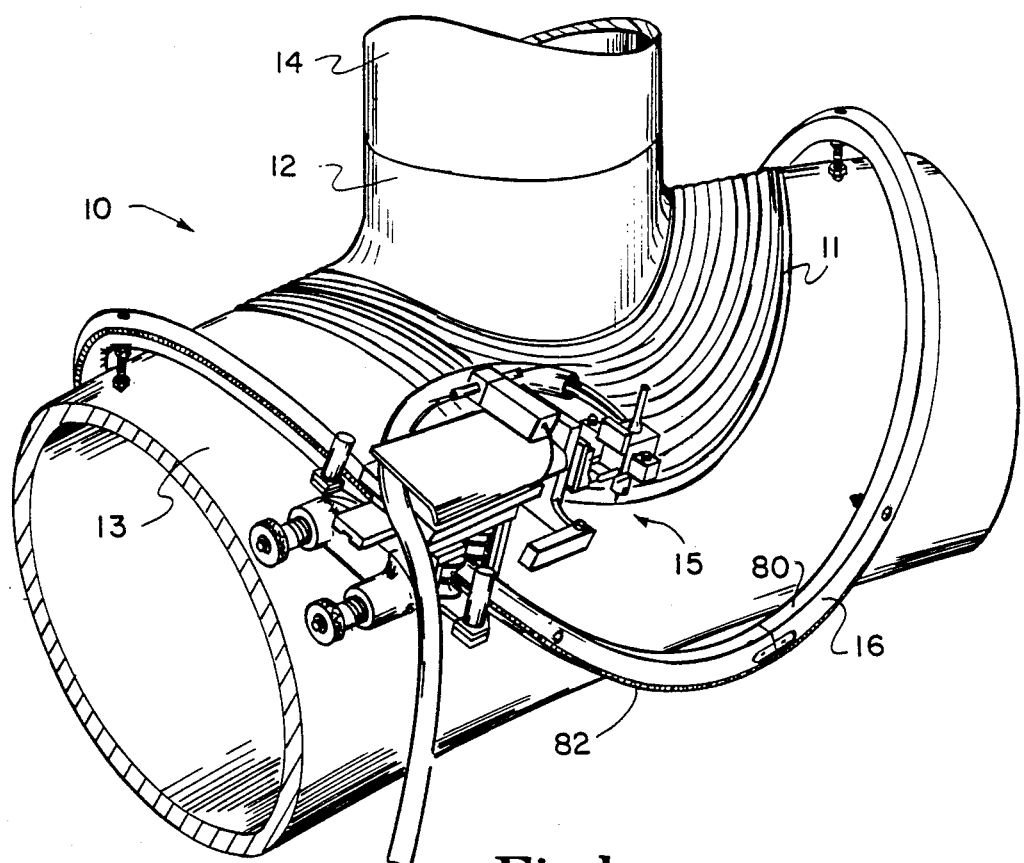
FIG. 1 is a perspective view of a track mounted remote device for overlay repair of saddle-shaped wells according to the present invention.
Figure 2:
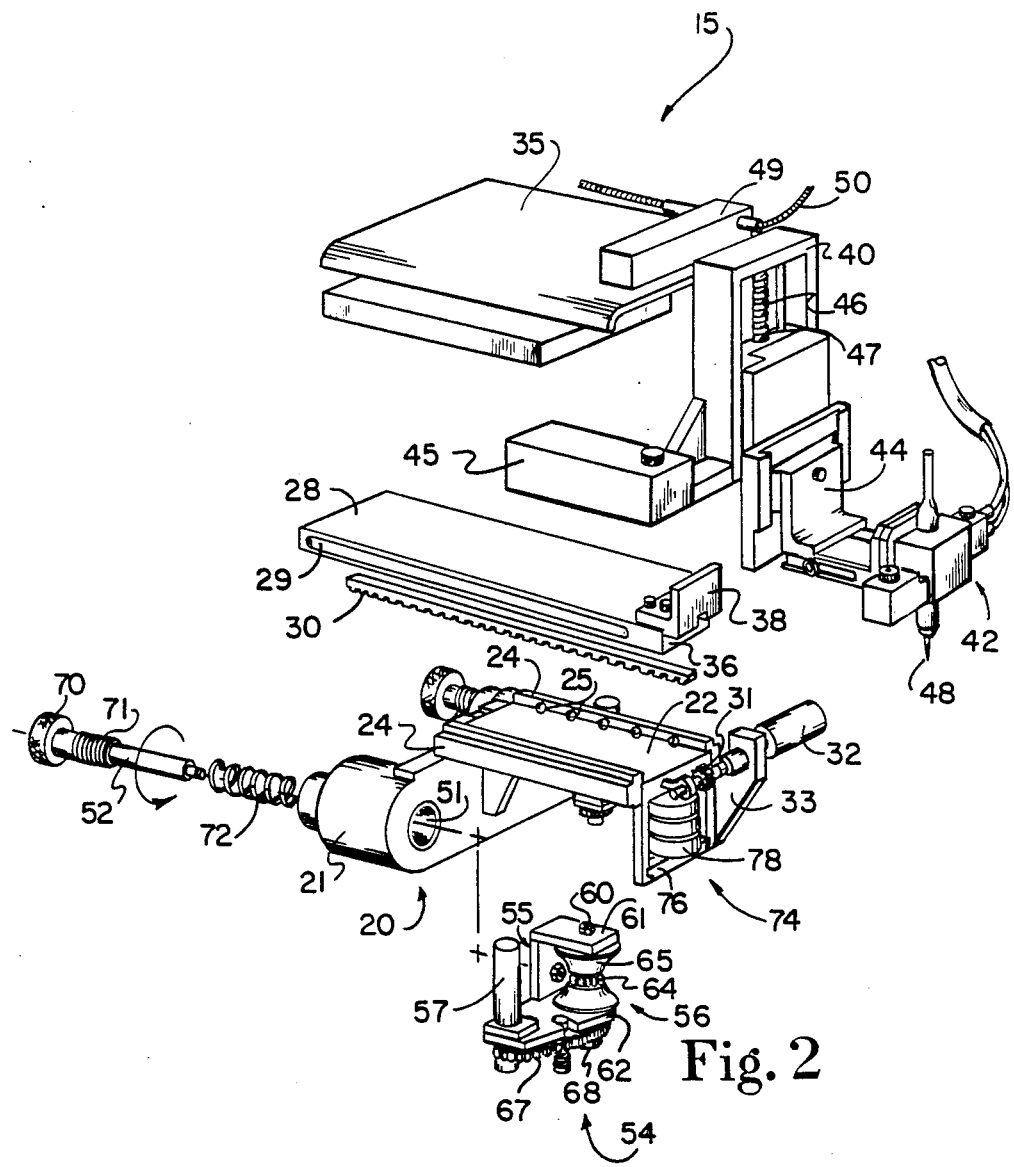
FIG. 2 exploded perspective view of the carriage of the welding apparatus of FIG. 1.

Referring now in more detail to the drawing, in which like numerals indicate like elements throughout the several views, FIG. 1 shows a weld-overlay apparatus 10 for remote application of weld overlay repair to a pre-existing weld 11 around the saddle-shaped sweepolet fitting 12 used to join a horizontal header pipe 13 and a vertical riser pipe 14. The weld-overlay apparatus 10 comprises a carriage 15 mounted for orbital movement around a saddle-shaped track 16 fitted to the header 13. While the weld-overlay apparatus 10 of the present invention was designed specifically for weld overlay repair of sweepolet fittings such as are found in recirculation, residual-heat-removal, core-spray, and reactor-water cleanup systems in boiling water nuclear reactors, it will be understood that the present invention can be used in any application where precise weld overlay repair of a weld in two orthogonal planes is desired.

Referring now to FIGS. 2 through 5, the carriage 15 includes a carriage frame 20 comprising a head bracket 21 at the rear end and a cross bracket 22 projecting forwardly from the upper end of the head bracket. A pair of opposing bearing housings 24 having ball bearings 25 mounted on their inner faces are attached to the upper longitudinal edges of the cross bracket 22. An oscillator bracket 28 having bearing races 29 in its outer longitudinal edges for receiving the bearings 25 is received for sliding movement between the bearing housings 24. A gear rack 30 longitudinally mounted on the lower face of the oscillator bracket 28 is engaged by a spur gear 31 rotationally driven by an oscillator drive motor 32 mounted by means of a motor bracket 33 to the front end of the cross bracket 22. In this manner, as the oscillator drive motor 32 rotates, the spur gear 31 engages the gear rack 30 on the bottom of the oscillator bracket 28, longitudinally reciprocating the oscillator bracket with respect to the carriage frame 20.

A cover plate 35 fits atop the opposing bearing housings 24, enclosing the oscillator bracket 28 and bearings 25. At the front end 36 of the oscillator bracket 28 is a bracket 38 to which is mounted a torch block support frame 40. A torch block 42 is slidingly received by the support frame 40 by means of a front end assembly 44. An arc voltage control motor 45 drives a worm gear 46 vertically disposed within the torch block support frame 40. The worm gear 46 engages a threaded vertical bore 47 in the front end assembly 44 to raise and lower the torch block 42 as the worm gear rotates. The operation of the motor 45 is controlled by conventional arc voltage control circuitry well known to those skilled in the art to maintain a constant clearance between the tungsten tip 48 of the torch block and the workpiece. A wire feed motor 49 mounted atop the cover plate 35 supplies wire 50 to the torch block 42.

The head bracket 21 defines a pair of cylindrical bores 51, one on either end of the head bracket, for receiving a pair of drive support shafts 52. A drive assembly 54 comprising a drive fork bracket 55, a drive roller 56, and a drive motor 57 is mounted to one end of each drive support shaft 52. The drive roller 56 includes a drive shaft 60 mounted for rotation about its longitudinal axis between the upper bracket fork 61 and the lower bracket fork 62. A drive spur gear 64 is concentrically mounted to the drive shaft 60 at a point intermediate the upper and lower bracket forks 61, 62. Opposing concave split rollers 65 are concentrically mounted on the drive shaft above and below the drive spur gear 64. The drive motor 57 drives a chain 67, which in turn engages a gear 68 concentrically mounted on the lower end of the drive shaft 60 to rotatably drive the drive roller 56.

Figure 3:
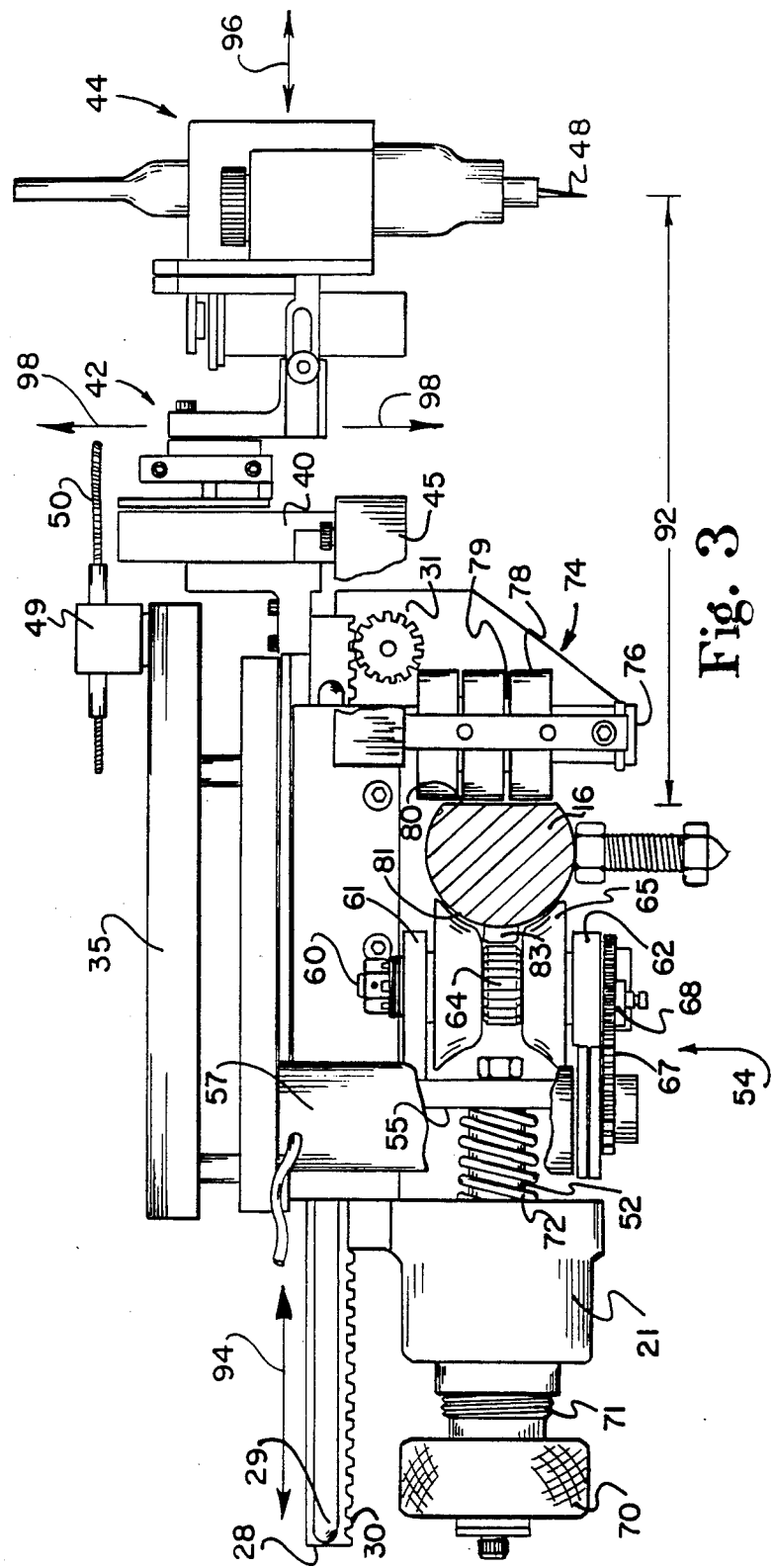
FIG. 3 is a side view of the carriage of FIG. 2.

With the drive assemblies 54 thus mounted to the pivot shafts 52 received within the cylindrical bores 50 of the head bracket 21, the drive assemblies are free to rotate relative to the carriage frame 20. A knurled handknob 70 having a threaded outer circumferential surface 71 at one end thereof is mounted to the other end of each drive support shaft 52. A threaded bushing (not shown) interior of each bore 50 threadingly receives the threaded circumference 71 of the knurled knob 70 to adjust the knob, and hence the pivot shaft 52, with respect to the carriage frame 20. A compression spring 72 concentric to the drive support shaft 52 and interposed between the head bracket 21 and the drive fork bracket 55, as shown in FIG. 3, biases the drive assembly 54 away from the head bracket. The drive assembly can be adjusted toward or away from the head bracket 21 by turning the knurled handknob 70.

A track roller assembly 74 is mounted beneath the forward end of the cross bracket 22. The upper end of a track roller shaft 75 (shown in FIG. 11) is received for rotation in the bottom of the cross bracket 22 and the lower end of the roller shaft is received for rotation by a U-shaped track roller bracket 76 depending downwardly from the front edge of the cross bracket. A plurality of track rollers 78 are concentrically mounted about the track roller shaft and are maintained in spaced-apart relation by washers 79.

Figure 10:
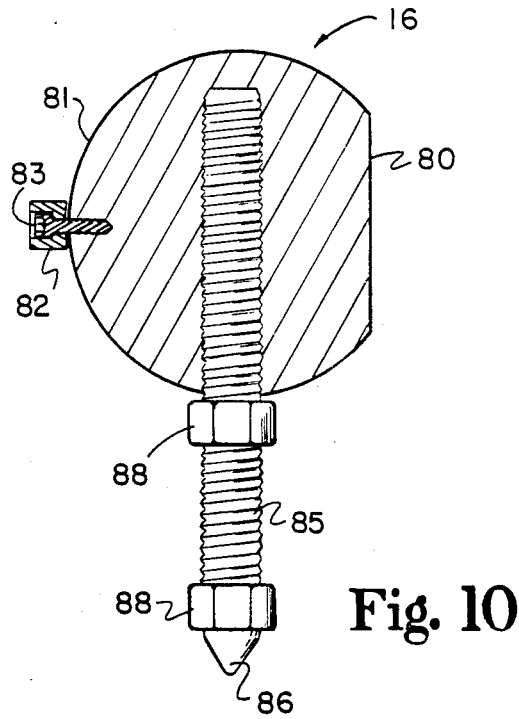
FIG. 10 is a cross-sectional view of the track of the welding apparatus of FIG. 1.
Figure 11:
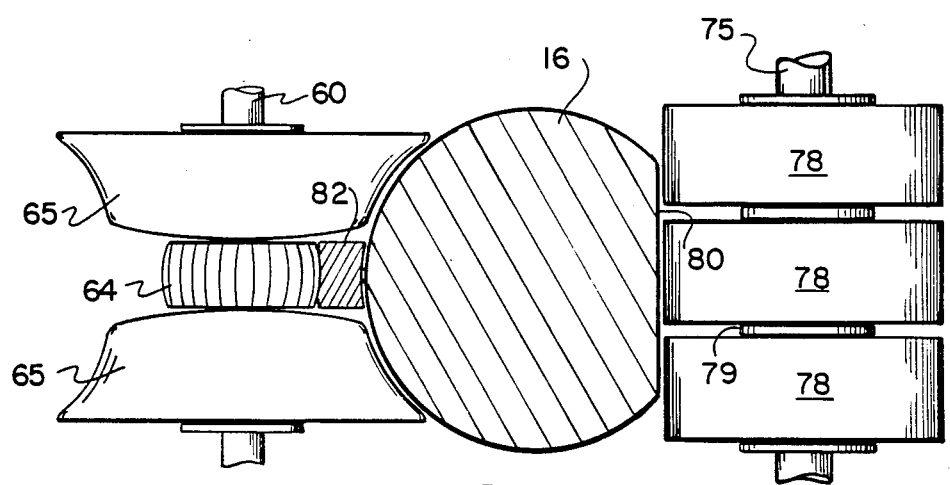
FIG. 11 is a partial cut away side view of the track showing the cooperation between the track and the track-engaging elements of the carriage.

Referring now to FIGS. 10 and 11, the track 16 has the cross section of a circle which has been flattened on its inner side 80. The outer edge of the track opposite the flattened face 80 has a gear rack 82 attached thereto by screws 83 or the like. The track is mounted to the workpiece by means of a threaded shaft 85 having a pointed tip 86 which bears against the workpiece. A pair of nuts 88 threadingly received onto the shaft 85 permit adjustment of the shaft with respect to the track, and, accordingly, the clearance between the track and the workpiece.

Referring now to FIGS. 3 and 11, the carriage 15 is mounted to the track 16 by engagement of the drive assemblies 54 and the track roller assembly 74 with the track. The concave upper and lower split rollers 65 of each drive assembly 54 conform to the outer circumference 81 of the track 16, and the drive spur gears 64 engage the toothed gear rack 83. The track rollers 78 bear against the flat inner face 80 of the track. Since the torch block 42 is cantilevered with respect to the track 16, the track rollers 78 bearing against the flat face 80 of the track are necessary to prevent the carriage 15 from rotating with respect to the track. As shown in FIG. 3, the compression spring 72 biases the drive assembly 54 against the outer surface 81 of the track 16, urging the inner flat face 80 of the track into engagement with the track roller assembly 74.

Figure 6:
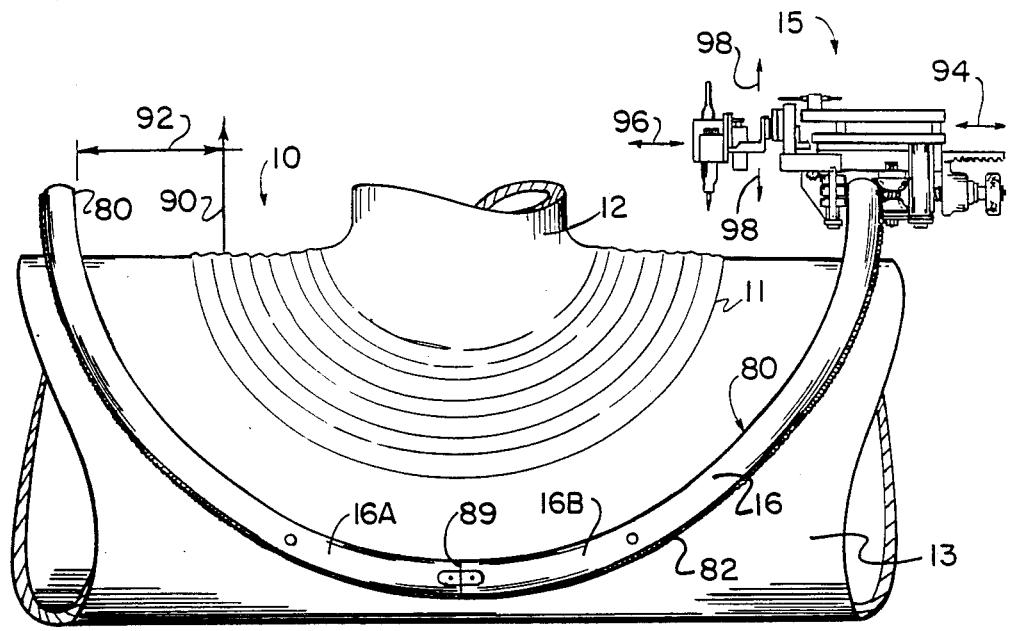
FIG. 6 is a side view of the welding apparatus of FIG. 1.
Figure 7:
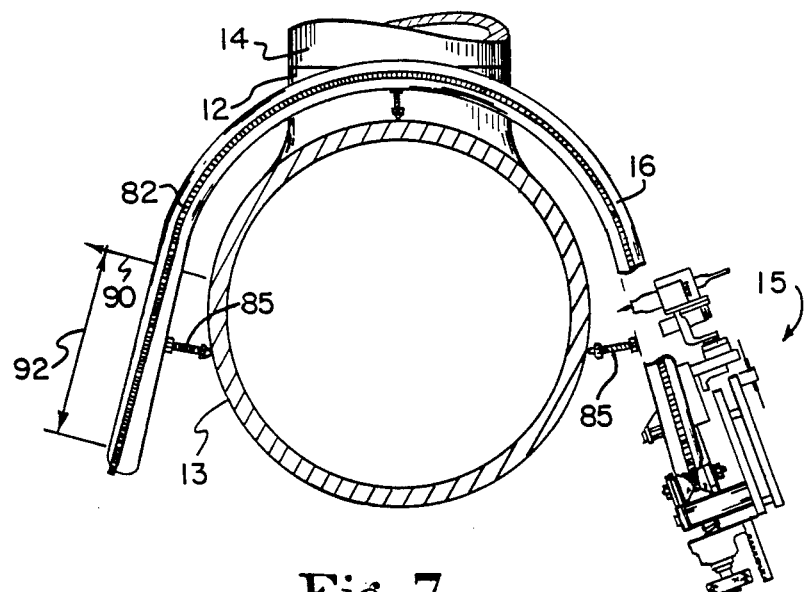
FIG. 7 is an end view of the welding apparatus of FIG. 1
Figure 8:
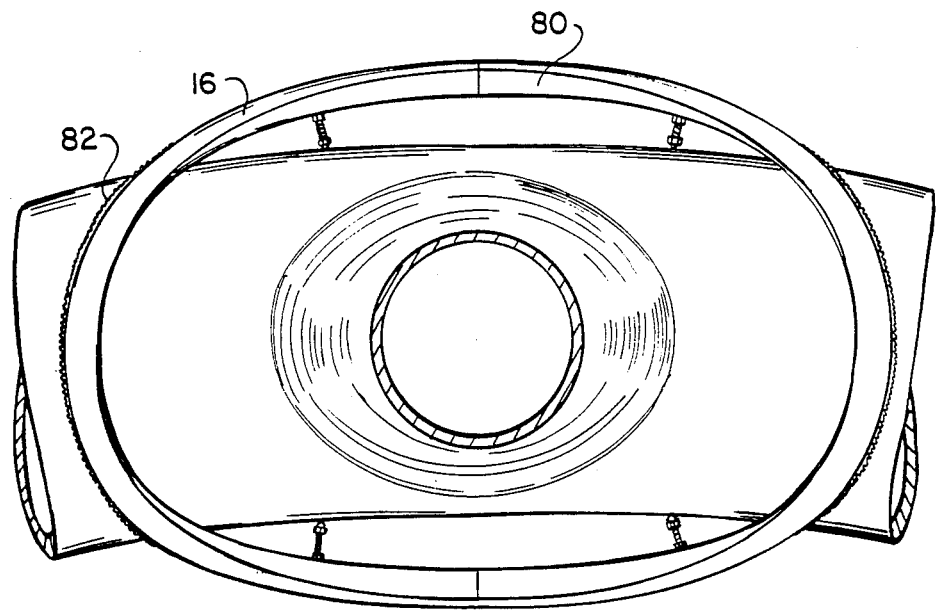
FIG. 8 is a top view of the track of the welding apparatus of FIG. 1 with the carriage removed.

Referring now to FIGS. 6 and 7, the track 16 is saddle-shaped and generally concentric to the saddle weld 11 which is being overlayed. The track 16 is comprised of two track sections 16A, 16B which are fitted together around the sweepolet fitting 12 and joined to one another at a juncture 89. The purpose of the track is to define a path around which the carriage 15 must travel in order to move the tip 48 of the torch block 42 along the saddle weld 11 while maintaining the torch block perpendicular to the adjacent surface of the header pipe 13 at all times.

Figure 9:
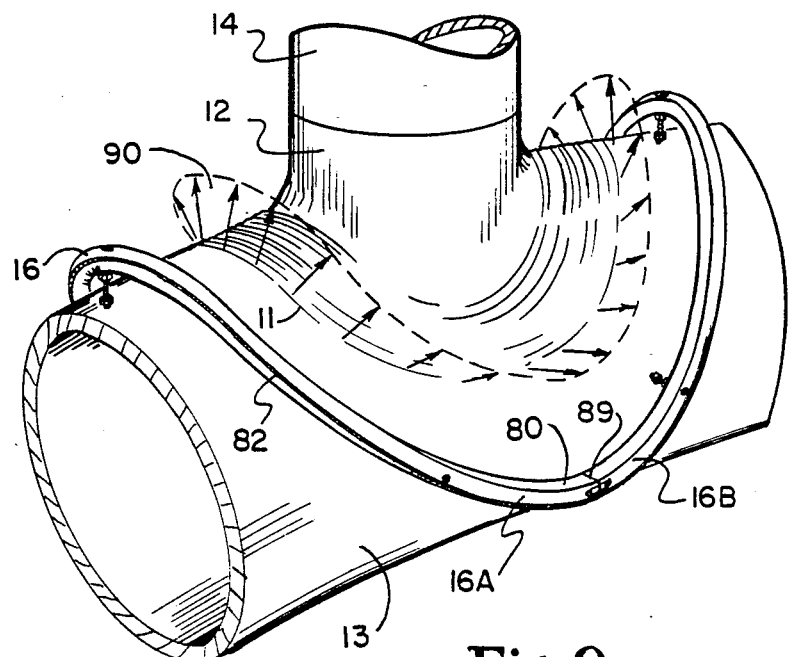
FIG. 9 is a perspective view of the track of FIG. 1 attached to a workpiece.

Since the torch block 42 is mounted in fixed angular relation to the carriage 15, in order for the torch to be maintained in perpendicular relation to the surface of the header pipe 13, the carriage must be maintained in constant angular relation to an imaginary surface 90 defined by lines projecting radially outwardly from the workpiece along the path defined by the preexisting weld 11, as best seen in FIG. 9. Accordingly, since the angular relation between the track 16 and the carriage 15 depends on the orientation of the flat face 80 of the track, the flat face must be maintained in constant angular orientation to the imaginary surface 90 projecting radially from the workpiece along the path of the preexisting weld 11 in order to maintain the carriage in proper orientation.

Furthermore, since it is desired to move the torch block 42 along the predetermined path defined by the preexisting weld 11, and since the torch is offset from the track 16 by a fixed distance indicated by the line 92, the carriage must travel along a path parallel to the aforementioned imaginary surface 90 and offset therefrom by a distance equal to the distance 92 by which the torch is offset from the track. Accordingly, the track 16 must follow a path which is a fixed distance from the imaginary surface 90 defined by lines projecting radially outwardly from the header pipe 13 along the path of the preexisting saddle-shaped weld 11.

When the carriage is at the topmost point of the track, as indicated schematically in FIG. 6, the right angle offset 92 from the perpendicular projection 90 outwardly of the saddle weld 11 is parallel to the upper surface of the header pipe 13. Accordingly, the carriage 15 must be parallel to the upper surface of the pipe 13 to maintain the torch head 42 in a perpendicular attitude with respect to the saddle weld 11 at the top of the pipe. In order to maintain the carriage 15 in this attitude, the flattened inner face 80 of the track must be parallel to the perpendicular projection 90 outwardly of the saddle weld.

As the carriage orbits around the track to the lowermost position indicated in FIG. 7, the track is again offset by the distance 92 from the flat face 80 of the track 16 to the torch head 42 from the perpendicular projection 90 radially outwardly of the saddle weld. However, since the surface of the header pipe 13 in the orthogonal plane normal to the track at that point is convex, the surface of the pipe curves away from the track. Accordingly, in order to maintain the torch block 42 normal to the saddle weld 11, the track 16 must be offset from the header pipe at that point by a considerably greater distance. It will be appreciated that, in order to maintain the flat inner face 80 of the track parallel to the perpendicular projection radially outwardly of the saddle weld, the track must "twist" around its longitudinal axis.

The track 16 is supported above the header pipe 13 by the six threaded rods 85 which are adjustable relative to the track to control the clearance between the track and the workpiece. It will be appreciated that four lowermost threaded rods engage the workpiece at a point below its horizontal center. Thus, the track cannot become disengaged upwardly because the pipe becomes wider above the lower contact points.

To use the weld overlay apparatus of the present invention, the two halves 16A, 16B of the track 16 are fitted together from opposite sides of the riser 14 and matingly attached to each other at the juncture 89. The threaded rods 85 are adjusted to achieve the proper clearance between the track and the workpiece. The carriage 15 is then attached to the track 16 by unscrewing the knurled knobs 70 to retract the drive assembly 54 toward the head bracket 21, fitting the carriage down onto the track, and screwing the knurled knobs to move the drive assembly into engagement with the outer surface 81 of the track, the drive spur gear 64 engaging the gear rack 83. As the knurled knob 70 is tightened, the track roller assembly 74 is urged into contact with the flat inner face 80 of the track.

With the carriage thus installed, an operator can move the carriage orbitally around the track by actuating the drive motor 57. The drive motor drives the drive roller 56 which engages the gear rack 82 on the outer circumference 81 of the track. As the carriage moves about the track, the track rollers 78 engage the flat inner face 80 of the track 16 to maintain the carriage 15 in its proper attitude.

To apply a weld overlay to either side of the pre-existing weld 11, the operator actuates the oscillator drive motor 32. The oscillator drive motor drives the spur gear 31, which engages the rack 30 on the bottom of the oscillator bracket 28, moving the oscillator bracket in the direction indicated by the arrows 94 in FIG. 6. As the oscillator bracket moves, the torch head 42 is moved back and forth across the width of the pre-existing weld 11 in the direction indicated by the arrows 96 to apply a weld overlay to either side of the pre-existing weld.

To compensate for variations in the clearance between the torch tip 48 and the workpiece, the arc voltage control mechanism actuates the motor 45 which drives the worm gear 46, moving the front end assembly 44 upwardly and downwardly within the torch block support frame 40. As the front end assembly moves, the torch tip 48 is raised and lowered with respect to the workpiece along the direction indicated by the arrow 98 in FIG. 6. In this manner, the apparatus compensates for the alternating flat and concave geometries encountered as the torch head moves back and forth across the width of the pre-existing weld.

Figure 4:
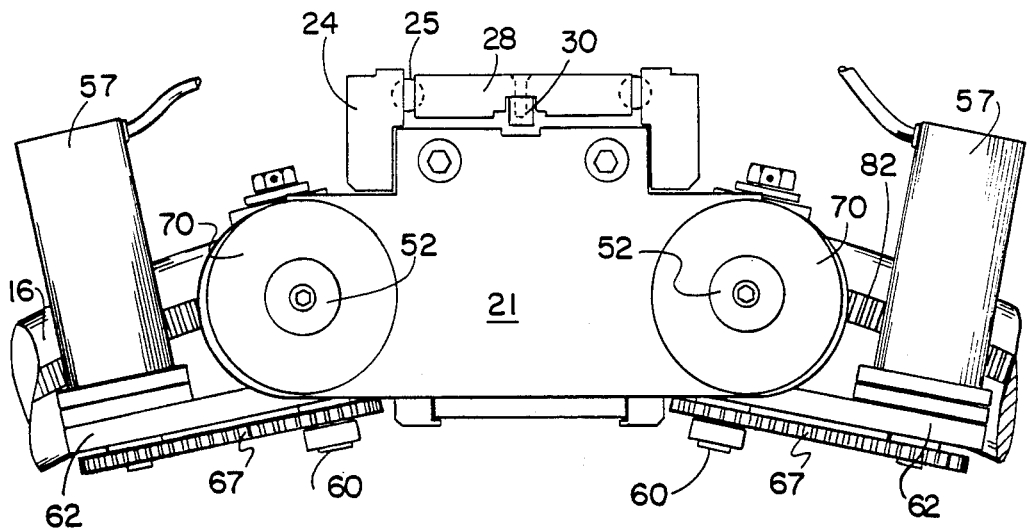
FIGS. 4 and 5 are opposing end views of the welding carriage of FIG. 2.
Figure 5:
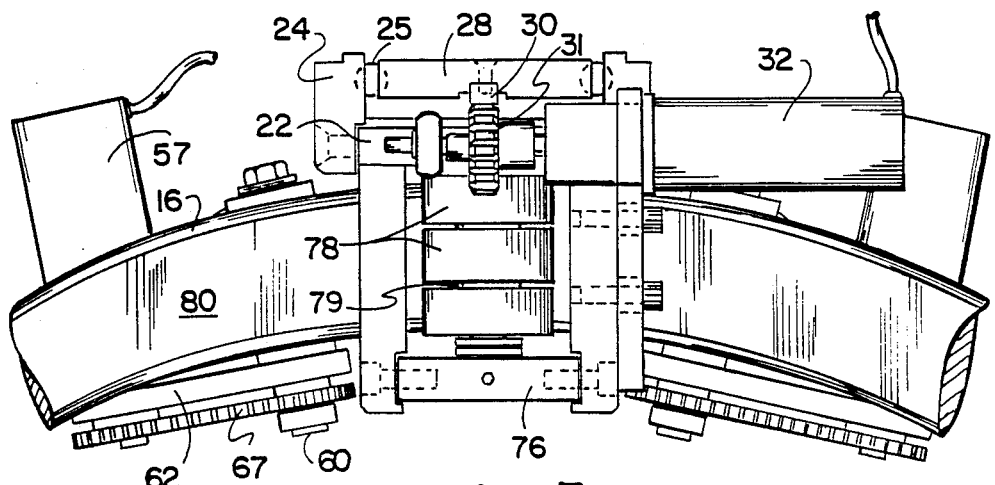

As the carriage 15 encounters track sections which are curved in an orthogonal plane normal to the longitudinal axis of the carriage, such as is shown in FIG. 4, the upper and lower concave split rollers 65 of the drive roller 56 conform to the curved track sections and cause the drive assemblies 54 to pivot on their drive support shafts 52. In this manner, the drive spur gears 64 of the drive assemblies 54 maintain driving engagement with the gear rack 82 even as the track curves.

One feature of the present invention is that the welding torch can be transported around the path of the pre-existing weld, back and forth across the width of the pre-existing weld, and upwardly and downwardly with respect to the workpiece, all by actuating one or more electric motors. The advantage of this feature is that by using video equipment to monitor the progress of the welding apparatus, the apparatus can be operated by remote control. This advantage is of particular benefit in hostile environments such as radioactively contaminated areas of nuclear power plants. The apparatus can be quickly erected on the workpiece and then operated by remote control a safe distance away from the contaminated area.

While the apparatus of the present invention is adapted to transport a welding torch along a saddle-shaped path for weld overlay repair of a sweepolet fitting, it will be understood that other tools, such as inspection equipment, can be mounted to the carriage for transport thereon. Similarly, while the track of the disclosed embodiment is specifically shaped to transport a tool along a saddle-shaped path, it will be appreciated that the track may be adapted to conform to any predetermined path in two orthogonal planes.

Finally, it will be understood that the preferred embodiment of the present invention has been disclosed by way of example, and that other modifications may occur to those skilled in the art without departing from the scope and spirit of the appended claims.

What is claimed is:

1. An apparatus for positioning a welding torch to apply a weld overlay to a pre-existing along a substantially saddle-shaped juncture between a cylindrical workpiece and a substantially perpendicular intersecting pipe, comprising:

a carriage adapted to receive a welding torch for mounting to said carriage in fixed angular relation thereto;

a track selectively mountable to a workpiece for receiving said carriage for movement thereon, said track defining a pre-determined path substantially parallel to an imaginary surface defined by lines projecting radially outwardly along a path defined by a pre-existing weld, said track further having a flat face formed longitudinally thereon, said face being in constant angular orientation with respect to said imaginary surface projecting radially said pre-existing weld and having a varying angular orientation with respect to horizontal, and said track further having a gear rack longitudinally mounted thereon;

a cylindrical roller mounted for rotation on said carriage in fixed angular relation thereto and disposed to engage said flat face of said track such that said roller engaging said flat face maintains said carriage in constant angular relation to said imaginary surface projecting normally from said pre-existing weld;

a gear mounted on said carriage for driven rotation such that said driven gear engages said gear rack to move said carriage along said track; and means associated with said carriage for mounting said welding torch for movement toward and away from said workpiece in a direction normal to said workpiece and for translational movement across the width of said pre-existing weld.

2. An apparatus for positioning a weld head to apply a weld overlay to a pre-existing weld along a substantially saddle-shaped juncture between a cylindrical workpiece and a substantially perpendicular intersection pipe, comprising:

a carriage adapted to receive a weld head for mounting thereon;

a track selectively mountable to a workpiece for receiving said carriage for movement thereon, said track defining a pre-determined path substantially parallel to an imaginary surface projecting radially outwardly from said a pre-existing weld;

a flat face formed on said track, said face being in constant angular relation to said imaginary surface projecting radially outwardly from pre-existing weld and having a varying angular orientation with respect to horizontal;

a cylindrical roller mounted for rotation on said carriage and disposed to engage said flat face of said track; and means associated with said carriage for mounting said weld head for movement toward and away from said workpiece in a direction normal to said workpiece and for translational movement across the width of said pre-existing weld.

3. The apparatus of claim 2, further comprising automatic voltage control circuitry operatively associated with said means for mounting said weld head for movement toward and away from said workpiece, whereby said weld head is automatically maintained in constant spaced apart relationship from said workpiece.

4. The apparatus of claim 2, further comprising means operatively associated with said carriage for driving said carriage for orbital movement around said track.

5. The apparatus of claim 4, wherein said track further comprises a gear rack longitudinally mounted thereto, and wherein said driving means comprises a gear mounted for driven rotation on said carriage such that said driven gear engages said gear rack to move said carriage along said track.

6. The apparatus of claim 5, wherein said driven gear is pivotably mounted to said carriage such that said gear maintains engagement with said gear rack when said track curves in a plane parallel to said imaginary surface projecting normally from said pre-existing weld.

7. An apparatus for applying a weld overlap to a pre-existing weld at a saddle-shaped juncture between a cylindrical workpiece and a substantially perpendicular pipe, comprising:
 a carriage;
 a track selectable attachable to a workpiece for receiving said carriage for movement thereon, said track defining a pre-determined path substantially concentric with a pre-existing weld;
 means for driving said carriage for orbital movement around said track;
 a welding torch mounted to said carriage in fixed angular relation thereto and disposed on said carriage such that as said carriage orbitally moves around said track the tip of said welding torch follows a path substantially corresponding to said pre-existing weld;
 means for maintaining said welding torch at a predetermined distance from said workpiece;
 means for oscillating said welding torch across the width of said pre-existing weld;
 a flat face formed longitudinally on said track in constant angular relation to an imaginary surface projecting radially outwardly from said cylindrical workpiece along the path of said pre-existing weld and having a varying angular orientation with respect to horizontal; and
 means operatively associated with said carriage for engaging said flat face such that said carriage is maintained in pre-determined angular relation with respect to said flat face, whereby said welding torch is maintained in perpendicular relation to the surface of said workpiece.

8. The apparatus of claim 7, wherein said welding torch is mounted for movement along its longitudinal axis with respect to said carriage, and wherein said means for maintaining said welding torch at a predetermined distance from said workpiece comprises arc voltage control circuitry operative to move said welding torch along its longitudinal axis with respect to said carriage toward and away from the surface of said workpiece to compensate for the convex geometry of said cylindrical workpiece.

9. The apparatus of claim 7, wherein said means operatively associated with said carriage for engaging said flat face comprises a cylindrical roller mounted for rotation in fixed angular relation to said carriage such that said roller engaging said flat face maintains said carriage in constant angular relation to said imaginary surface projecting normally from said pre-existing weld.

* * * * *